Nov. 11, 1941.  K. A. BROWNE  2,261,954
DYNAMIC ENGINE SUSPENSION
Filed April 15, 1939
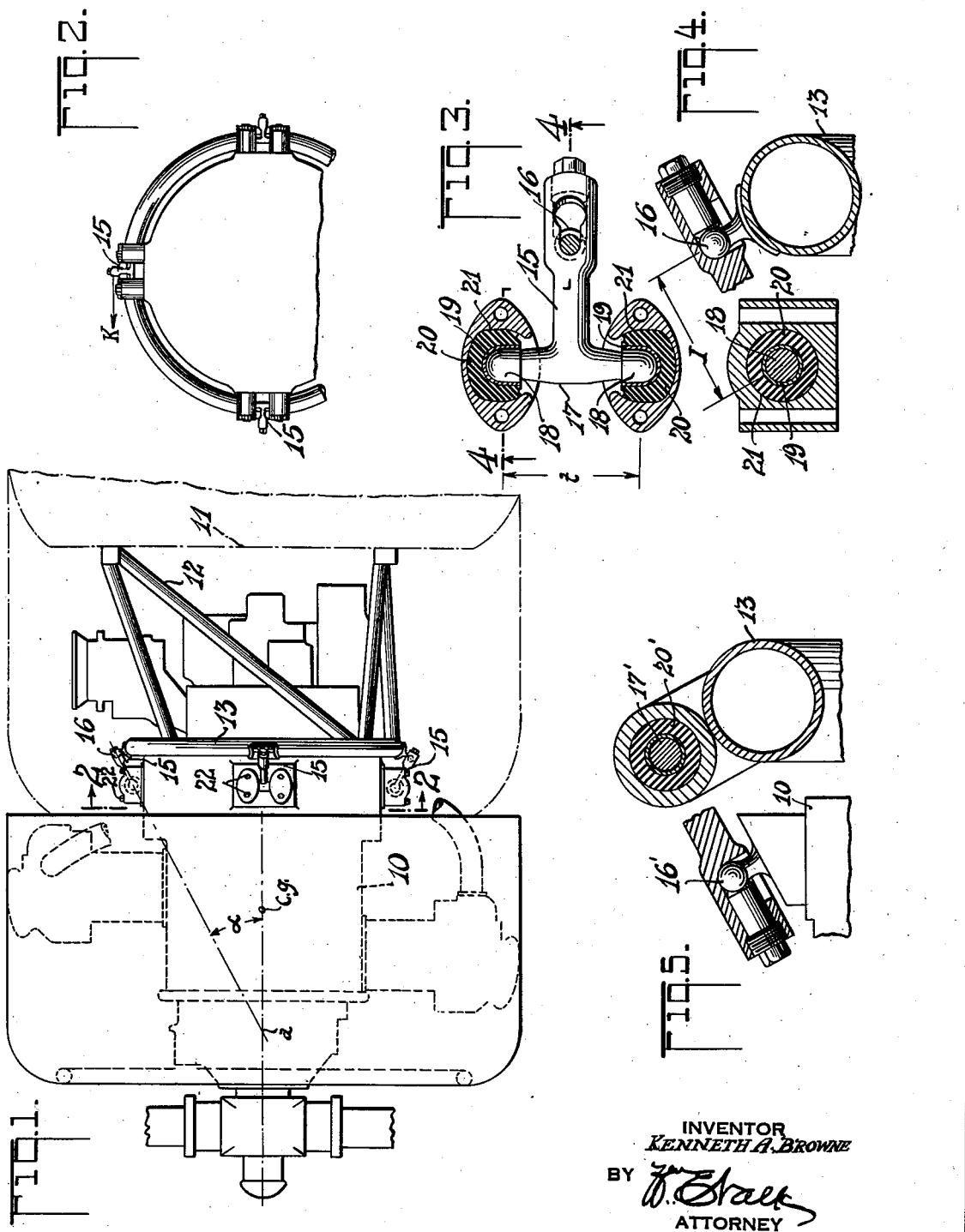
INVENTOR
KENNETH A. BROWNE
BY
ATTORNEY Patented Nov. 11, 1941

2,261,954

UNITED STATES PATENT OFFICE 2,261,954

DYNAMIC ENGINE SUSPENSION

Kenneth A. Browne, Westwood, N. J., assignor to Wright Aeronautical Corporation, a corporation of New York Application April 15, 1939, Serial No. 267,970

6 Claims. (Cl. 248—5)

This invention relates to mounting devices for vibratory bodies, and is particularly concerned with improvements in the specific form of resilient connections between a body and a support according to the general teachings of application Serial No. 155,174, filed July 23, 1937, in the name of Edward S. Taylor, and application Serial No. 183,986, filed January 8, 1938, in the names of Edward S. Taylor and Kenneth A. Browne, which applications matured respectively into Patents Nos. 2,175,999 and 2,175,825 on October 10, 1939.

The said Taylor patent teaches a method of support for a vibratory body wherein the support is spaced from the center of gravity of the body, and wherein resilient connections are so disposed as to provide a virtual support for the body at its own center of gravity. The second patent above mentioned comprises structural improvements in the first, teaching the use of links joining the body and support so arranged geometrically as to procure a virtual support for the body at its center of gravity despite the spacing of the body center of gravity from the support plane.

An object of this invention is to provide a link supporting organization so constructed as to procure ratios of stiffness along the various axes taught in said prior patents, which are independent of the characteristics of the rubber or other elastic medium used in the structure.

A further object is to provide a simplified form of rubber and link arrangement which makes unnecessary the use of specialized forms of rubber bushings, thereby allowing of considerable latitude in the selection of the form of rubber adapted to the assembly.

Further objects and advantages will be apparent from a reading of the subjoined specification and claims, together with an examination of the accompanying drawing, in which:

Fig. 1 is a side elevation of an aircraft engine mounting embodying the devices of the invention;

Fig. 2 is a section taken on the line 2—2 of Fig. 1;

Fig. 3 is a plan, partly in section, of one of the mounting units;

Fig. 4 is a section on the line 4—4 of Fig. 3, and

Fig. 5 shows an alternative disposition of the components of the mounting units.

As indicated in the objects of the invention, the teachings of this invention are adapted for use in the mounting of any kind of vibratory body to a support, but the particular application in which it finds great utility is in the mounting of aircraft engines to aircraft structures. Fig. 1 shows the conventional disposition of an engine with respect to the aircraft structure, in which the engine is indicated at 10 and the structure at 11, the latter having a tubular engine mount 12 having a ring 13 secured at its forward end. The engine conventionally is mounted at a vertical plane rearward of its center of gravity to the ring 13 but, in accordance with the teachings of this and the said prior applications, the connections from the engine to the ring 13 comprise elastic devices having several axes of differential stiffness, the stiffest axes converging from the mounting ring 13 to a point $a$ on the engine axis which lies forward of the center of gravity, these stiff axes making the angle $\alpha$ with the engine axis. A less stiff principal axis of the mounting unit lies tangent to the mounting circle, and the third principal axis is of still less stiffness and is normal to the tangential and $\alpha$ axes indicated. In the case of link supports as taught in the Taylor-Browne application, this latter axis is substantially zero. In the present application, the use of link units 15 is contemplated, the principal axes thereof being on the $\alpha$ axis. These links 15 are circumferentially disposed around the mounting ring 13 and are secured at one end to the ring by universal joints 16. At their other ends, they are provided with an integral T-head 17 of appropriate length, the ends of the head 17 being formed as more or less hemispherical plugs 18 engaging respectively within thimbles 19 bonded to rubber cups 20 set into socket members 21 which are secured as by bolts 22 to the engine casing. It will be apparent that the sockets 21 are circumferentially spaced around the engine and that the sockets and T-heads 17 are all substantially coplanar.

The length of the T-head 17 is designated $t$, and the length of the link proper, from the ball and socket joint to the axis of the T-head, is indicated as $l$. The function $$\left(\frac{2l}{t}\right)^2$$

equals the ratio L between the spring rates along the axis of the link 15 and the tangential spring rate of the mounting unit relative to the engine, this function L being one of the parameters of the design of an engine mount according to the teachings of the said prior applications. In this instance, the function L is wholly independent of the hardness, size or shape of the rubber cups 20, being wholly dependent upon the dimensions of the link member. Thus, any desired form of rubber socket or, in fact, elastic mounting between the ends of the T-head of the engine, may be used, the material being selected for best life and resilient response over a wide temperature range.

It will be obvious that the teachings of this mode of engine mounting are likewise met by reversing the links, as shown in Fig. 5, wherein the universal joint 16′ is on the engine and the T-head 17′ and rubber cups 20′ are on the mounting structure.

It is also within the purview of the invention to utilize a rubber universal joint in lieu of the joint 16 or, to utilize a link having the form of the letter H in which rubber sockets would be used at each end of the end portions of such a link. If this arrangement is used, the ratio L becomes $$\left(\frac{l}{t}\right)^2$$

Essentially, the links 15 may be identified as members having triangularly disposed mounting portions, two of which are secured to one of the members of the engine-mount combination by resilient or elastic devices, and the other of which is secured to the other member by either a universal joint or an elastic connection. Alternatively, the link may partake of quadrangular form in which opposite pairs of corners are secured to the respective members by elastic devices.

The general design considerations of this mount and the formula by which the design is accomplished are similar to the teachings of said prior applications. The specific shape and form of the link 15 is immaterial, and the specific arrangement of the elastic connections is likewise immaterial to a fulfillment of the provisions of the invention, except as such may be limited by the claims.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine-to-support mounting connection comprising opposed socket elements securable to the engine within the sockets of which are disposed elastic cups of rubber or the like, a strut between said sockets having rounded ends engaged in said cups, a link integral with and extending normally from the strut, and a swivel connector at the end of said link, said connector being attachable to the support.

2. A mounting for an engine member on a support member comprising links each having triangularly disposed connection portions, two of which comprise plug elements and one of which comprises an element of a ball and socket joint, rubber sockets closed at their outer ends embracing said plug elements the closed socket ends elastically restraining the plug elements against endwise movement, means for attaching said rubber sockets to one said member, and another ball and socket joint element secured to the other member and engaging said first ball and socket joint element.

3. A flexible mounting unit comprising an integral T-link, a universal connector at the end of the link stem, closed-end rubber thimbles over the ends of the link head the closed ends elastically restraining the link head from endwise movement, and mounting means for said thimbles.

4. A flexible mounting unit for connecting a body member and a support member comprising a stem and an integral extended head across an end thereof, a swivel connection at the stem end securable to one member, and closed-end sockets securable to the other member, containing elastic closed-end cups within which the ends of said head are engaged, the closed ends of which elastically restrain the head from endwise movement.

5. A flexible mounting unit for connecting a body member to a support member comprising a pair of facing sockets closed at their most remote ends, on one member, elastic cups of rubber or the like in said sockets, a T-shaped link the ends of the head of which are engaged in said cups and bear against the cup bottoms for elastic endwise restraint thereof, and a universal swivel connection between the end of the stem of the link and the other member.

6. A flexible mounting unit for connecting a body member to a support member comprising a pair of facing sockets on one member, elastic cups of rubber or the like in said sockets, said cups having metallic thimbles bonded thereto on the inner surface thereof, a T-shaped link the ends of the head of which are in fitting engagement with said thimbles, and a universal swivel connection between the end of the stem of the link and the other member.

KENNETH A BROWNE.